(12) United States Patent
Burchard et al.

(10) Patent No.: US 10,955,429 B1
(45) Date of Patent: Mar. 23, 2021

(54) INSPECTION WORKCELL

(71) Applicant: National Technology & Engineering Solutions of Sandia, LLC, Albuquerque, NM (US)

(72) Inventors: Ross L. Burchard, Albuquerque, NM (US); Kristopher R. Klingler, Albuquerque, NM (US); Brad Boyce, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 238 days.

(21) Appl. No.: 16/167,759

(22) Filed: Oct. 23, 2018

Related U.S. Application Data

(60) Provisional application No. 62/595,399, filed on Dec. 6, 2017.

(51) Int. Cl.
    *G01N 35/00* (2006.01)
(52) U.S. Cl.
    CPC ................. *G01N 35/0099* (2013.01)
(58) Field of Classification Search
    CPC .................................................. G01N 35/0099
    See application file for complete search history.

(56) References Cited

U.S. PATENT DOCUMENTS

| | | | | |
|---|---|---|---|---|
| 4,673,075 A * | 6/1987 | Ueyama | ........... | G05B 19/41815 198/339.1 |
| 4,722,298 A * | 2/1988 | Rubin | ............... | H01L 21/67196 118/715 |
| 4,752,352 A * | 6/1988 | Feygin | .................. | B23P 15/246 216/33 |
| 4,956,777 A * | 9/1990 | Cearley | .................... | B61L 27/04 180/168 |
| 5,076,205 A * | 12/1991 | Vowles | ............. | H01L 21/67184 118/715 |
| 5,125,149 A * | 6/1992 | Inaba | ..................... | B23P 19/001 198/341.05 |
| 5,301,863 A * | 4/1994 | Prinz | ....................... | B22F 3/008 228/33 |
| 5,353,490 A * | 10/1994 | Kukuljan | ................ | B23P 21/00 29/564 |
| 5,363,310 A * | 11/1994 | Haj-Ali-Ahmadi | .... | B65G 1/137 414/273 |
| 5,936,861 A * | 8/1999 | Jang | .................... | G05B 19/4099 700/98 |
| 6,312,525 B1 * | 11/2001 | Bright | ............... | H01L 21/67017 118/719 |
| 6,934,600 B2 * | 8/2005 | Jang | ........................ | B82Y 30/00 700/182 |
| 6,983,547 B2 * | 1/2006 | Fleming | .................. | F16C 11/12 33/1 M |
| 7,065,892 B2 * | 6/2006 | Fleming | .................. | F16C 11/12 33/502 |
| 7,353,954 B1 * | 4/2008 | Malek | ................... | B07C 5/3404 198/400 |

(Continued)

*Primary Examiner* — David J Bolduc

(74) *Attorney, Agent, or Firm* — Daniel J. Jenkins

(57) ABSTRACT

An inspection workcell includes an equipment rack for securing one or more part trays comprising inspection parts, one or more inspection stations for inspecting the inspection parts, and a robotic manipulator for transporting the one or more part trays from the equipment rack to the one or more inspection stations.

16 Claims, 9 Drawing Sheets

(56) References Cited

U.S. PATENT DOCUMENTS

| | | | |
|---|---|---|---|
| 7,783,447 B2* | 8/2010 | Co | B25J 9/1666 |
| | | | 702/121 |
| 7,911,778 B2* | 3/2011 | Merrow | G11B 33/08 |
| | | | 361/679.37 |
| 9,573,235 B2* | 2/2017 | Lee | G01R 31/2867 |
| 9,778,650 B2* | 10/2017 | Scelsi | B23P 21/00 |
| 2002/0019683 A1* | 2/2002 | White | B33Y 30/00 |
| | | | 700/255 |
| 2002/0075009 A1* | 6/2002 | Butler | G01R 1/06772 |
| | | | 324/534 |
| 2002/0184746 A1* | 12/2002 | Kusmierczyk | B23P 21/004 |
| | | | 29/33 P |
| 2003/0048941 A1* | 3/2003 | Minami | G01N 21/95692 |
| | | | 382/165 |
| 2003/0106492 A1* | 6/2003 | Levinson | B01L 3/5082 |
| | | | 117/200 |
| 2005/0274661 A1* | 12/2005 | Jackson | B23Q 7/1415 |
| | | | 55/385.1 |
| 2006/0038883 A1* | 2/2006 | Knoedgen | H04N 17/00 |
| | | | 348/92 |
| 2006/0038976 A1* | 2/2006 | Knoedgen | H04N 17/002 |
| | | | 356/10 |
| 2006/0267360 A1* | 11/2006 | Kiaie | H01L 21/67742 |
| | | | 294/188 |
| 2008/0201008 A1* | 8/2008 | Twelves | G05B 19/4099 |
| | | | 700/160 |
| 2008/0230349 A1* | 9/2008 | Moreira Guardao | |
| | | | B65G 1/0478 |
| | | | 198/463.3 |
| 2009/0185884 A1* | 7/2009 | Wurman | B65G 1/1373 |
| | | | 414/270 |
| 2009/0265035 A1* | 10/2009 | Jenkinson | B25J 19/021 |
| | | | 700/259 |
| 2010/0245558 A1* | 9/2010 | Koike | G01B 11/03 |
| | | | 348/86 |
| 2011/0005342 A1* | 1/2011 | Treat | A47B 81/00 |
| | | | 73/865.8 |
| 2011/0060449 A1* | 3/2011 | Wurman | G05B 19/41895 |
| | | | 700/218 |
| 2012/0209415 A1* | 8/2012 | Casanelles | B25J 19/06 |
| | | | 700/109 |
| 2013/0057310 A1* | 3/2013 | Hasegawa | G01R 31/2893 |
| | | | 324/757.01 |
| 2014/0121828 A1* | 5/2014 | Fuhlbrigge | G05D 1/0297 |
| | | | 700/228 |
| 2014/0352459 A1* | 12/2014 | Matsuzawa | H02N 2/0075 |
| | | | 73/865.8 |
| 2015/0093290 A1* | 4/2015 | Takai | G01N 35/00732 |
| | | | 422/65 |
| 2015/0128719 A1* | 5/2015 | Kilibarda | B23K 11/3063 |
| | | | 73/850 |
| 2015/0276549 A1* | 10/2015 | Lazic | B23F 23/02 |
| | | | 33/501.19 |
| 2015/0355229 A1* | 12/2015 | Rogel-Favila | G01R 31/2851 |
| | | | 324/756.02 |
| 2016/0075462 A1* | 3/2016 | Kang | B01L 3/5453 |
| | | | 156/576 |
| 2016/0076992 A1* | 3/2016 | Gillespie | G01N 21/01 |
| | | | 356/244 |
| 2016/0202279 A1* | 7/2016 | Endo | G01N 35/028 |
| | | | 73/863.01 |
| 2016/0224023 A1* | 8/2016 | Huang | G05B 19/41875 |
| 2016/0299161 A1* | 10/2016 | Mellars | G01N 35/04 |
| 2016/0325934 A1* | 11/2016 | Stiernagle | G07F 11/165 |
| 2017/0129717 A1* | 5/2017 | Herman | H05K 13/0818 |
| 2017/0254724 A1* | 9/2017 | Lazic | B23F 23/1218 |
| 2018/0157246 A1* | 6/2018 | Huang | G05B 19/41875 |
| 2018/0326590 A1* | 11/2018 | Masuda | B24B 27/0038 |
| 2018/0346305 A1* | 12/2018 | Procyshyn | B25J 11/00 |
| 2019/0152057 A1* | 5/2019 | Sharp | B25J 9/1664 |
| 2020/0068759 A1* | 2/2020 | Cvijetinovic | G05B 19/41875 |
| 2020/0103857 A1* | 4/2020 | Wynne | G05B 19/4155 |

* cited by examiner

INSPECTION WORKCELL

CROSS-REFERENCE TO RELATED APPLICATION

This application claims the benefit of U.S. Provisional Application No. 62/595,399, filed Dec. 6, 2017, entitled "Additive Manufacturing Inspection Workcell," which is incorporated herein by reference.

GOVERNMENT INTEREST STATEMENT

This invention was made with Government support under Contract No. DE-NA0003525 awarded by the United States Department of Energy/National Nuclear Security Administration. The U.S. Government has certain rights in this invention.

FIELD OF THE INVENTION

The present invention relates to metrology and, in particular, to an automated inspection workcell that can be used to inspect parts.

BACKGROUND OF THE INVENTION

Pre-fabricated parts typically require different inspection steps to ensure compliance with design requirements. Conventionally, such inspection steps are performed manually, such as with hand gauges and optical comparators, thereby increasing the opportunity for errors. Furthermore, each inspection step may be conducted at different locations, requiring transportation of the parts between the different locations, significantly increasing delays and costs.

SUMMARY OF THE INVENTION

The present invention is directed to a compact, scalable, and modular system and method to inspect parts. This automated inspection station workcell utilizes a robotic manipulator to transport pre-fabricated parts between inspection stations. To reduce part inspection times, e.g., from days to hours, an exemplary workcell utilizes a 6-DOF (degree-of-freedom) robot manipulator centrally positioned on a hexagonal base or floor plate. Six inspection stations are positioned adjacent to the hexagonal plate and surround the robot. This six-sided, or honeycomb configuration, allows human operators to deliver parts to an equipment rack and initiate automated inspections. Using pre-programmed paths, the robot manipulator can quickly transport parts to high-fidelity laser scanners, hardness testers, and roughness testers to record inspection data for post-processing and part validation.

In one embodiment, an inspection workcell includes an equipment rack for securing one or more part trays comprising inspection parts, one or more inspection stations for inspecting the inspection parts, and a robotic manipulator for transporting the one or more part trays from the equipment rack to the one or more inspection stations.

In another embodiment, an inspection workcell includes a first equipment rack for securing one or more part trays including inspection parts, one or more inspection stations for inspecting the inspection parts, and a robotic manipulator for transporting the one or more part trays from the first equipment rack to the one or more inspection stations. The one or more inspection stations is securable in the first equipment rack or in a second equipment rack.

In a further embodiment, method of inspecting a part includes securing one or more inspection parts in a part tray, securing the part tray in an equipment rack, providing one or more inspection stations for inspecting the one or more inspection parts, and transporting, via a robotic manipulator, the part tray from the equipment rack to the one or more inspection stations.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
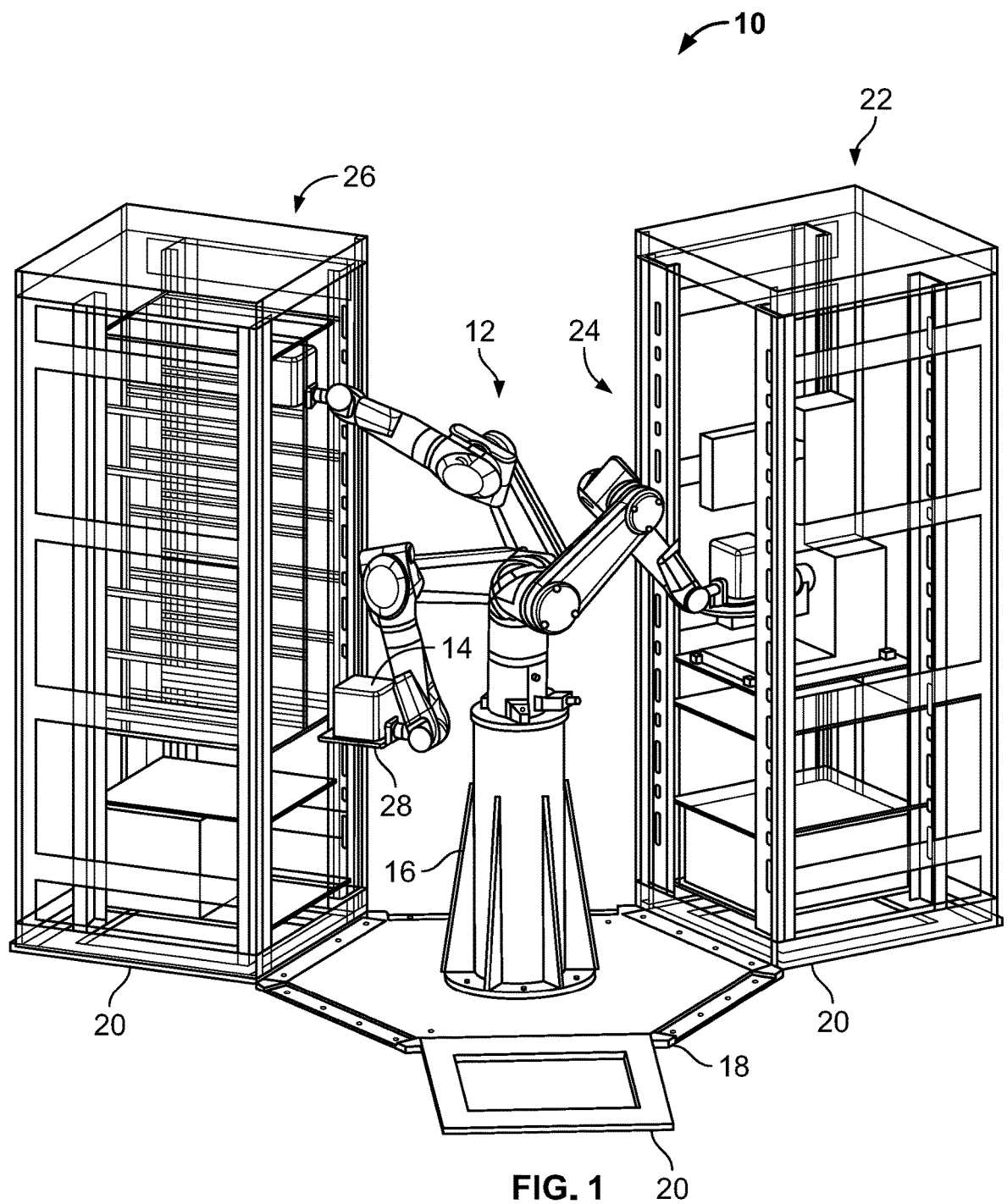
FIG. 1 is an upper perspective view of an exemplary inspection workcell, according to the present invention.
Figure 2:
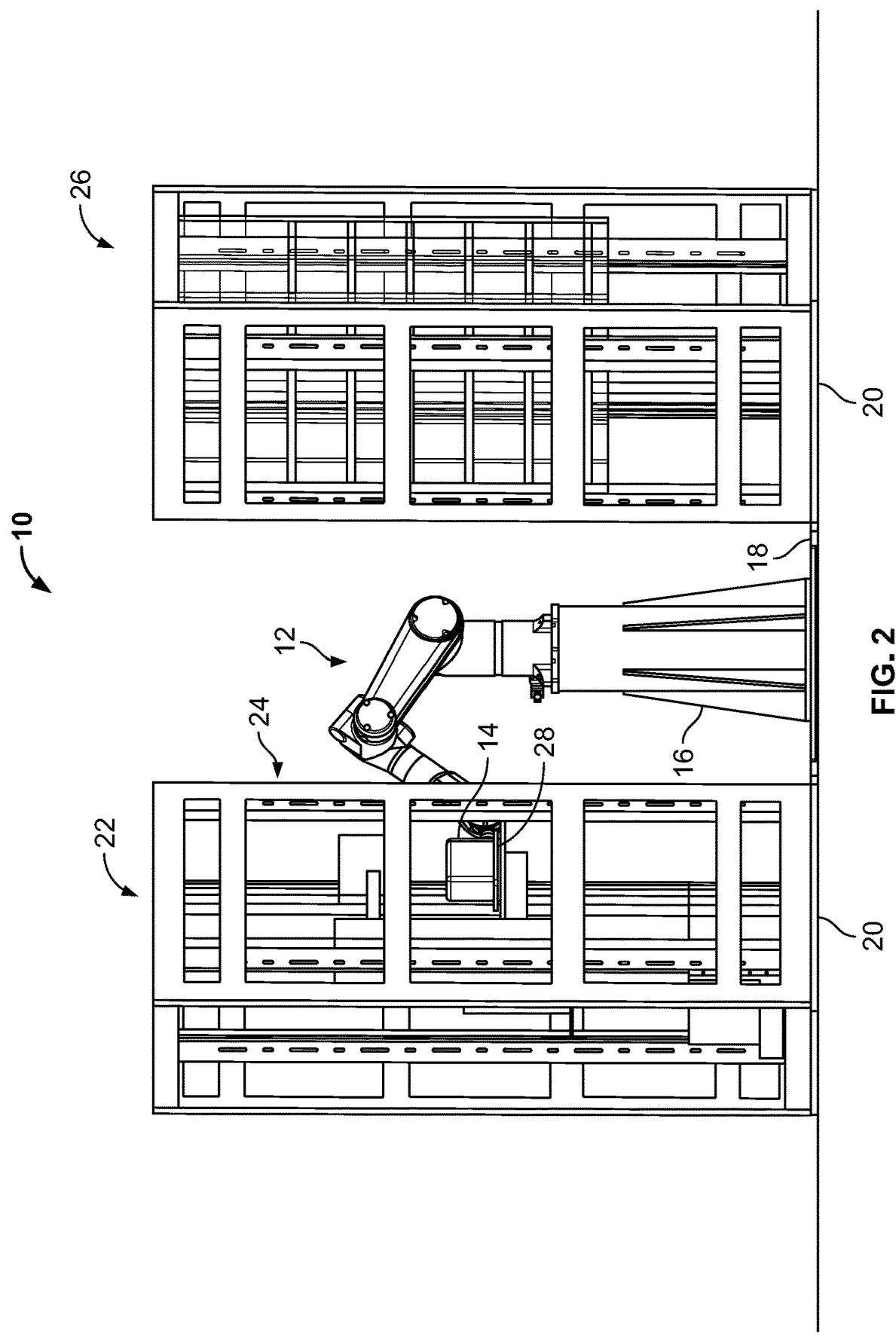
FIG. 2 is a reverse elevation view of the inspection workcell of FIG. 1, according to the present invention.
Figure 3:
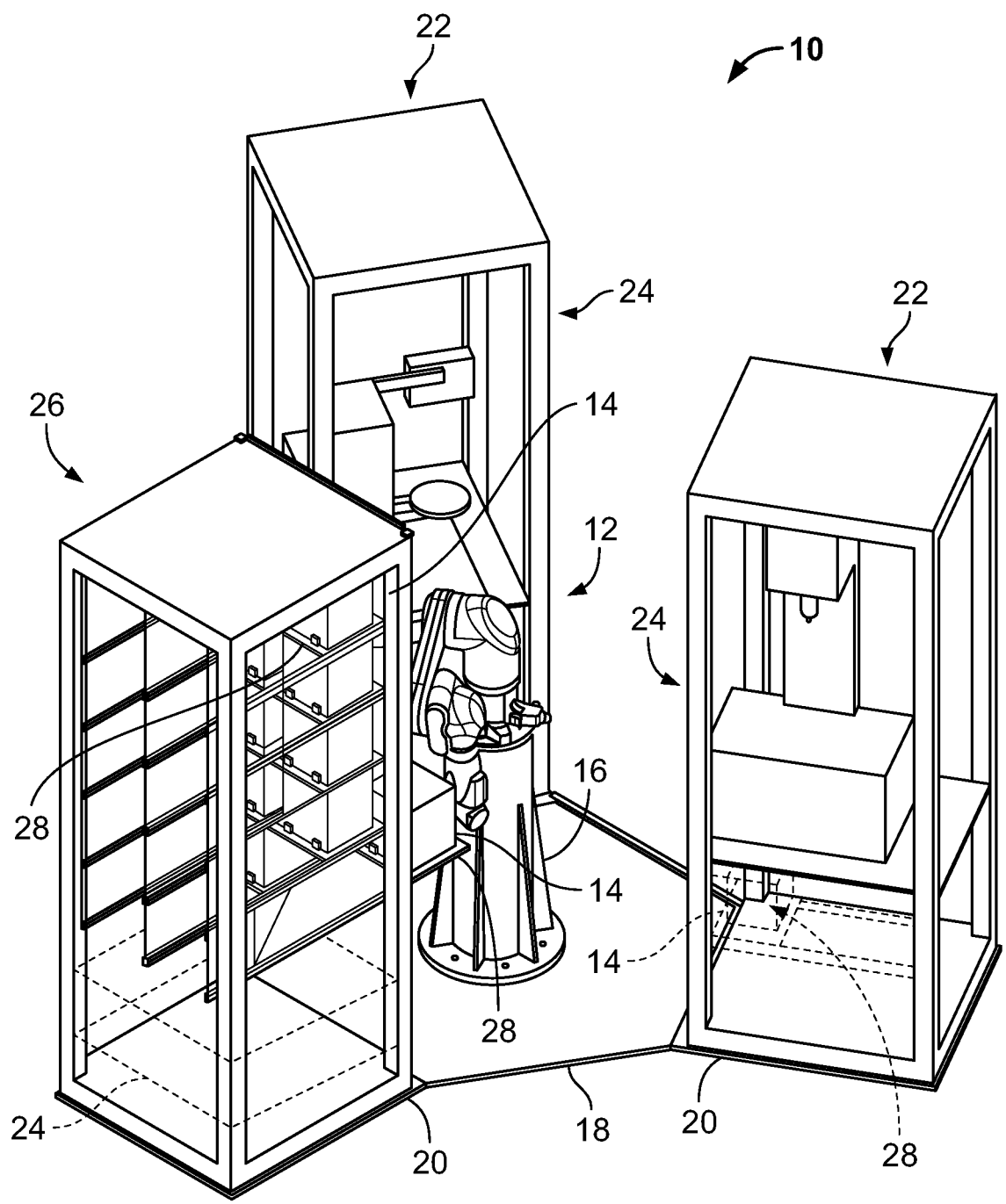
FIG. 3 is an upper perspective of an exemplary inspection workcell, according to the present invention.
Figure 4:
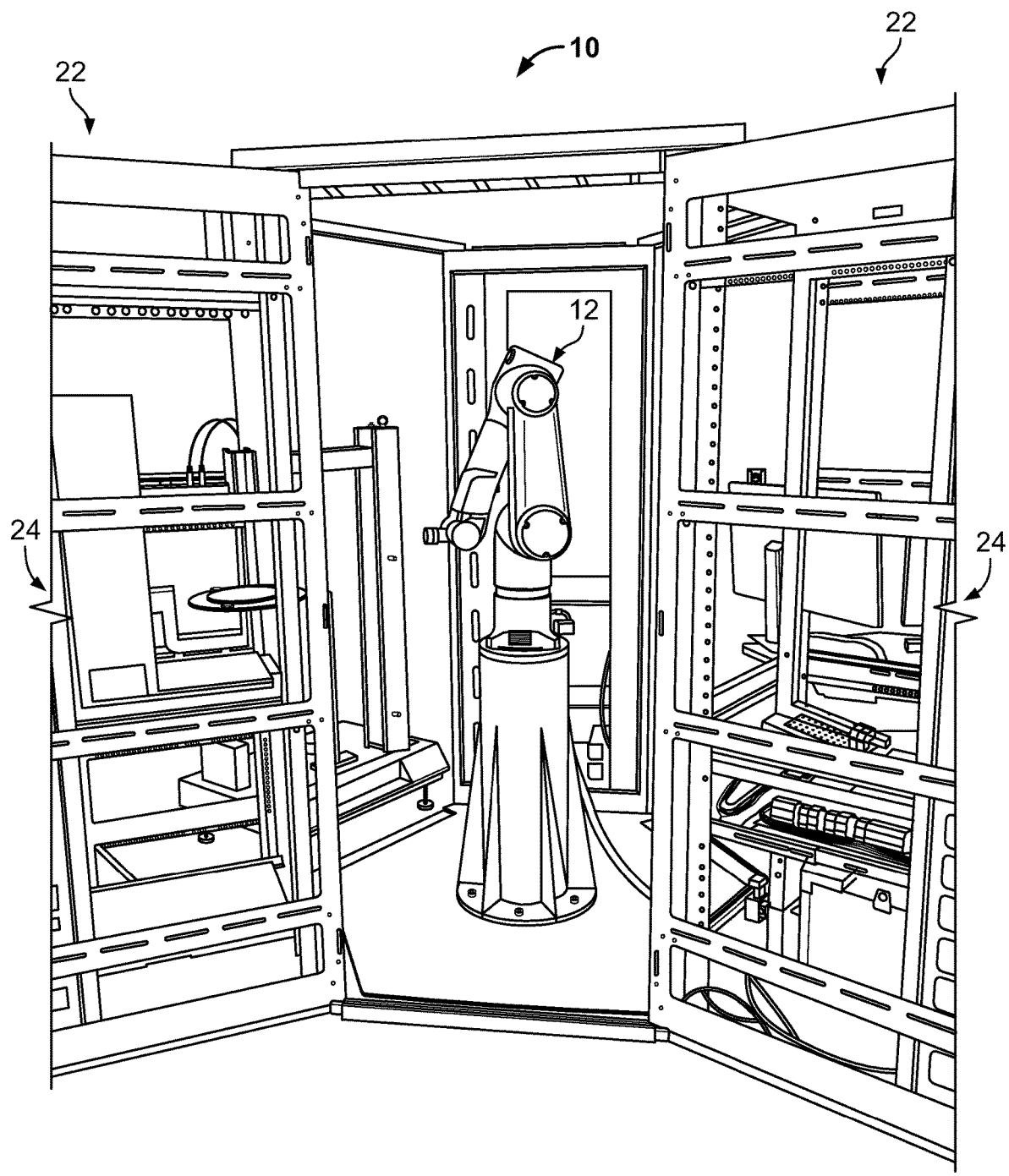
FIG. 4 is a front perspective view of an exemplary inspection workcell, according to the present invention.

The present invention is directed to a compact, scalable, and modular system to inspect parts, such as those fabricated with additive manufacturing technologies, also referred to as 3D Printing. As shown in FIGS. 1, 2, and 3, an exemplary inspection workcell 10 uses a hexagonal-shaped, or honeycomb configuration, to inspect pre-fabricated parts 14. In other embodiments, as will be discussed in more detail below, other shapes or configurations may be utilized. The exemplary inspection workcell comprises a 6-DOF robot manipulator 12 which is centrally mounted on a robot pedestal 16 of a hexagonal floor or base plate 18 to transport part trays 28 from an equipment rack 26 to an inspection station 24, and between inspection stations 24, returning the part trays 28 to equipment rack 26. This robot-mounting arrangement allows different types of robots to be quickly installed/removed to meet varying payload and accuracy requirements. A wide range of manipulators (high speed, high accuracy, high payload, etc.) can be mounted on the robot pedestal 16 to meet specific inspection needs. For example, a high-precision robot or robot manipulator 12, such as fabricated by Staubli International AG, having a 10-pound payload can be mounted on the pedestal to provide ±0.001 inch repeatability within the robot's entire working volume, as shown in FIG. 4.

Returning to FIG. 1, up to six rectangular floor plates 20, also referred to as "petals," can be selectively secured, such as by bolting or pinning or other suitable manner, to a corresponding portion of the periphery of the hexagonal base plate 18 to surround the robot manipulator 12 and provide a reconfigurable and transportable inspection workcell 10 having a hexagonal-shaped configuration. One or more equipment racks 22, such as low-cost commercially available 19-inch equipment racks, can be bolted to each floor plate 20 to secure an inspection station 24 to base plate 18. A pair of inspection stations 24 are shown in FIG. 3, for example. In one embodiment, equipment rack 22 may be adapted to be directly secured, such as by bolting to base plate 18, i.e., without requiring a floor plate 20. In one embodiment, more than one inspection station 24 may be secured in equipment rack 22. The equipment racks 22 are designed to be modular and transportable and can be sized to secure one or more inspection stations 24 that are suitable for an application. A large variety of inspection stations can be installed in the equipment racks to meet varying inspection needs. If a new automated inspection technology or application (3D scanning, hardness testing, or surface roughness, etc.) is required to meet current inspection requirements, an existing petal or floor plate 20/equipment rack 22 can be quickly unbolted from the hexagonal base plate 18 and replaced with a floor plate 20/equipment rack 22 having a different inspection station 24. It is to be understood that any suitable inspection device, encompassing, for example, material, chemical, electrical or other properties capable of automated inspection that can be secured by a corresponding equipment rack of the present invention, is contemplated herein. In one embodiment, all inspection stations 24 may be the same. In one embodiment, all inspection stations may be different from each other.

Figure 5:
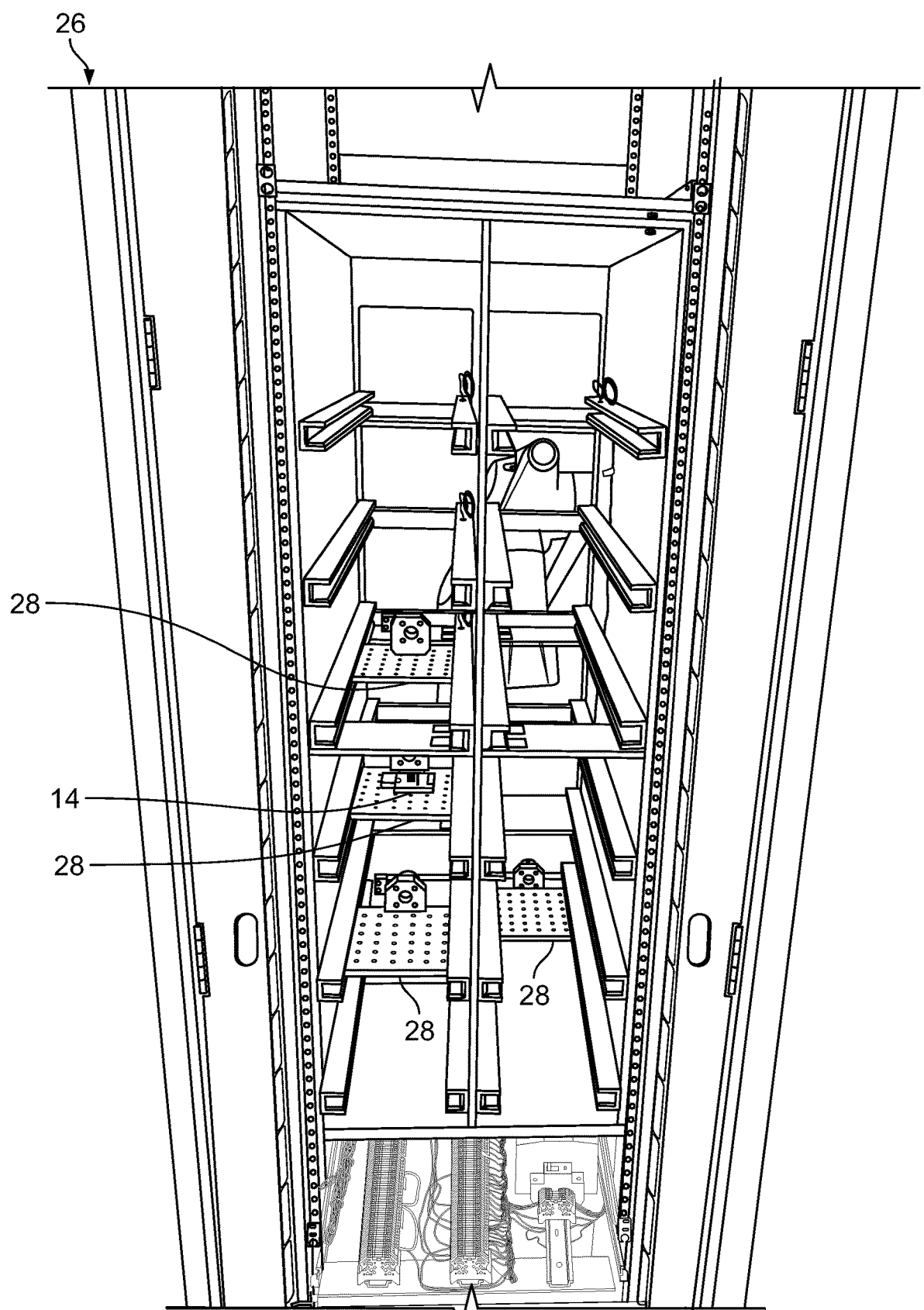
FIG. 5 is an enlarged, partial elevation view of an exemplary equipment rack, according to the present invention.
Figure 6:
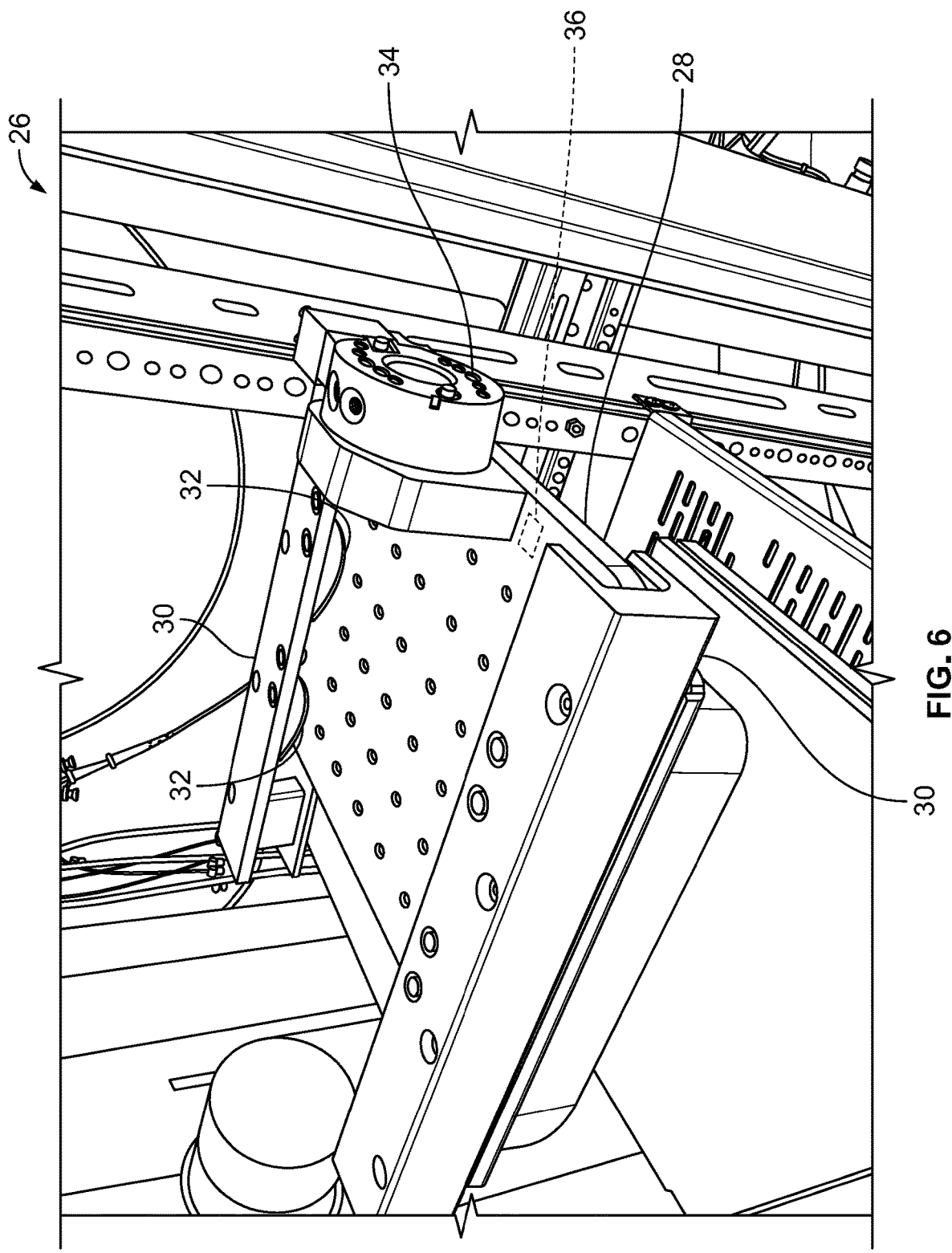
FIG. 6 is an enlarged, partial upper perspective view of secured part tray, according to the present invention.

As further shown in FIG. 1, an equipment rack 26 secures one or more part trays 28 that secure one or more pre-fabricated part or parts 14 for inspection. FIG. 5 shows an enlarged, partial elevation view of an exemplary equipment rack 26 securing several part trays 28. FIG. 6 shows an enlarged, partial upper perspective view of a secured part tray 28 in equipment rack 26. Equipment rack 26 includes a pair of facing C-shaped members 30 collectively defining a slot for receiving part tray 28 therein. As further shown in FIG. 6, resilient devices 32 are secured to surfaces of C-shaped members 30 to contact and apply a downward stabilizing/retention force to the corresponding facing surface of part tray 28 to secure part tray 28 in equipment rack 26. As further shown in FIG. 7, part tray 28 includes a coupler 34, actuated by pneumatics, electro-mechanical, hydro-mechanical or other suitable manner to be selectively received by robot manipulator 12 (FIG. 1). For reasons to be discussed in more detail below, in one embodiment, such as further shown in FIG. 7, part tray 28 may include a second coupler 34 positioned at an opposite end of part tray 28, permitting part tray 28 to be accessed/manipulated or transfected to another robotic manipulator 12 positioned on the opposite side of the corresponding equipment rack (FIG. 9C). Depending upon the application, one or more part trays 28 may be secured side-by-side in equipment rack 26, and a plurality of part trays 28 may be vertically secured in equipment rack 26. In one embodiment, one or more equipment racks 26 may serve as an input or receiving or pre-inspection area to secure part trays 28 securing one or more pre-fabricated parts 14 that have not yet been inspected, and one or more remaining equipment racks may serve as an output or post-inspection area to secure part trays 28 securing one or more pre-fabricated parts 14 that have been inspected. In one embodiment, equipment racks 26 may serve as both an input or receiving or pre-inspection area to secure part trays 28 securing one or more pre-fabricated parts 14, as well as an output or post-inspection area to secure part trays 28 securing one or more pre-fabricated parts 14 that have been inspected.

In one embodiment, equipment rack 22 may secure both one or more part trays 28, as well as one or more inspection stations 24, such as shown in FIG. 3. Similarly, as further shown in FIG. 3, in one embodiment, equipment rack 26 may secure both one or more part trays 28, as well as one or more inspection stations 24.

For purposes herein, the term "secures," "secured in," "secured by," and the like, are intended to mean that the components associated with inspection stations and part trays, including parts secured thereto, are positioned inside of the structural envelope of its corresponding equipment rack.

For purposes herein, an "equipment rack" includes both open structures, as well as at least partially closed structures, such as cabinets, so long as parts can be installed/removed by robotic manipulators, as disclosed herein.

As shown in FIGS. 1, 2 and 3, one or more of the six petals or floor plates 20 can be configured with equipment rack 26 that secures manually-loaded part trays 28. As shown in FIG. 6, each part tray 28 can be encoded with a unique identifier 36, such as an 8-bit identifier, to support part identification and data collection. In one embodiment, each equipment rack 26 can accommodate up to 12 part trays 28 arranged in a vertical 2×6 matrix. Different equipment racks can be installed to accommodate various-sized inspection parts 14 and arrangements of parts 14. The part trays 28 can securely mount inspection parts 14 on high-precision registration surfaces 38. In one embodiment, registration surface 38 includes uniformly spaced holes that can be used to support automated inspections. For example, ¼ inch threaded mounting holes 40 spaced on 1 inch centers can secure parts 14 with correspondingly sized threaded mechanical fasteners 42 to registration surface 38 in preparation of inspection of the parts 14. As further shown in FIG. 7, a portion 44 of registration surface 38 may be optionally removed to provide an open-frame construction, permitting enhanced access for inspection of the parts 14, such as permitting all surfaces of the parts 14 to be inspected.

For purposes herein, the term "high-precision registration surface", and the like, is intended to mean that features associated with the surface permit parts to be positioned with enhanced accuracy and repeatability suitable for a desired application requiring accuracy of ±0.001 inch or less.

Figure 7:
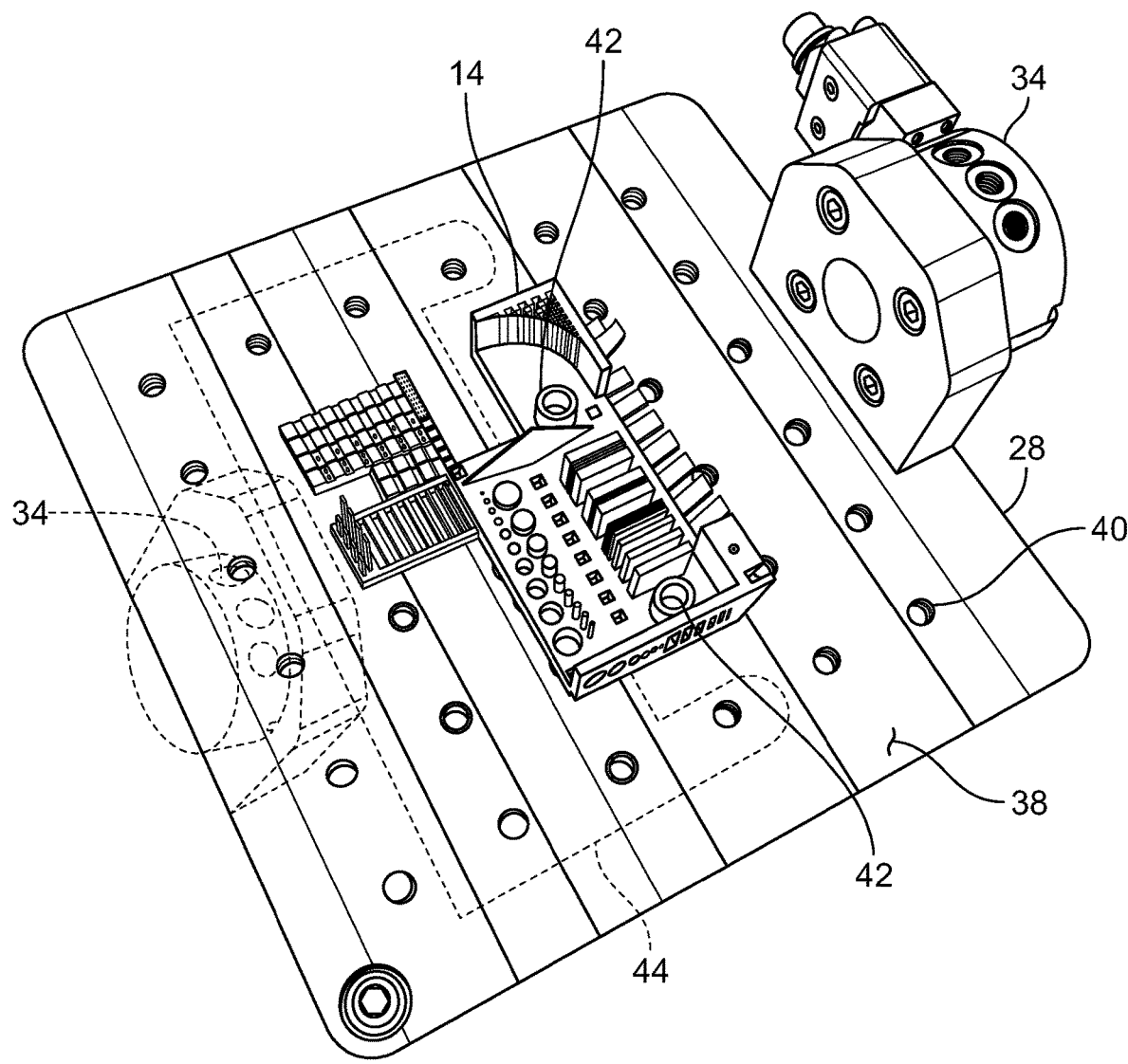
FIG. 7 is an upper perspective view of an inspection part secured to an exemplary part tray, according to the present invention.

After the inspection parts 14 are securely mounted to part tray 28, as shown in FIG. 7, they can be transported between selected inspection stations 24 by robot manipulator 12. The high-precision part trays 28 provide a consistent registration surface to accurately locate each part 14 as they are delivered to different inspection stations 24. In one embodiment, the registration surface is a precision-machined metal plate, such as aluminum, that permits parts to be precisely positioned for repeated part-scanning operations. Furthermore, accurately mounting the inspection parts 14 on registration surfaces 38 prevents the need to remount parts 14 between inspections, which increases the inspection data accuracy, and provides consistency of the geometric dataset alignment between inspections.

Figure 8:
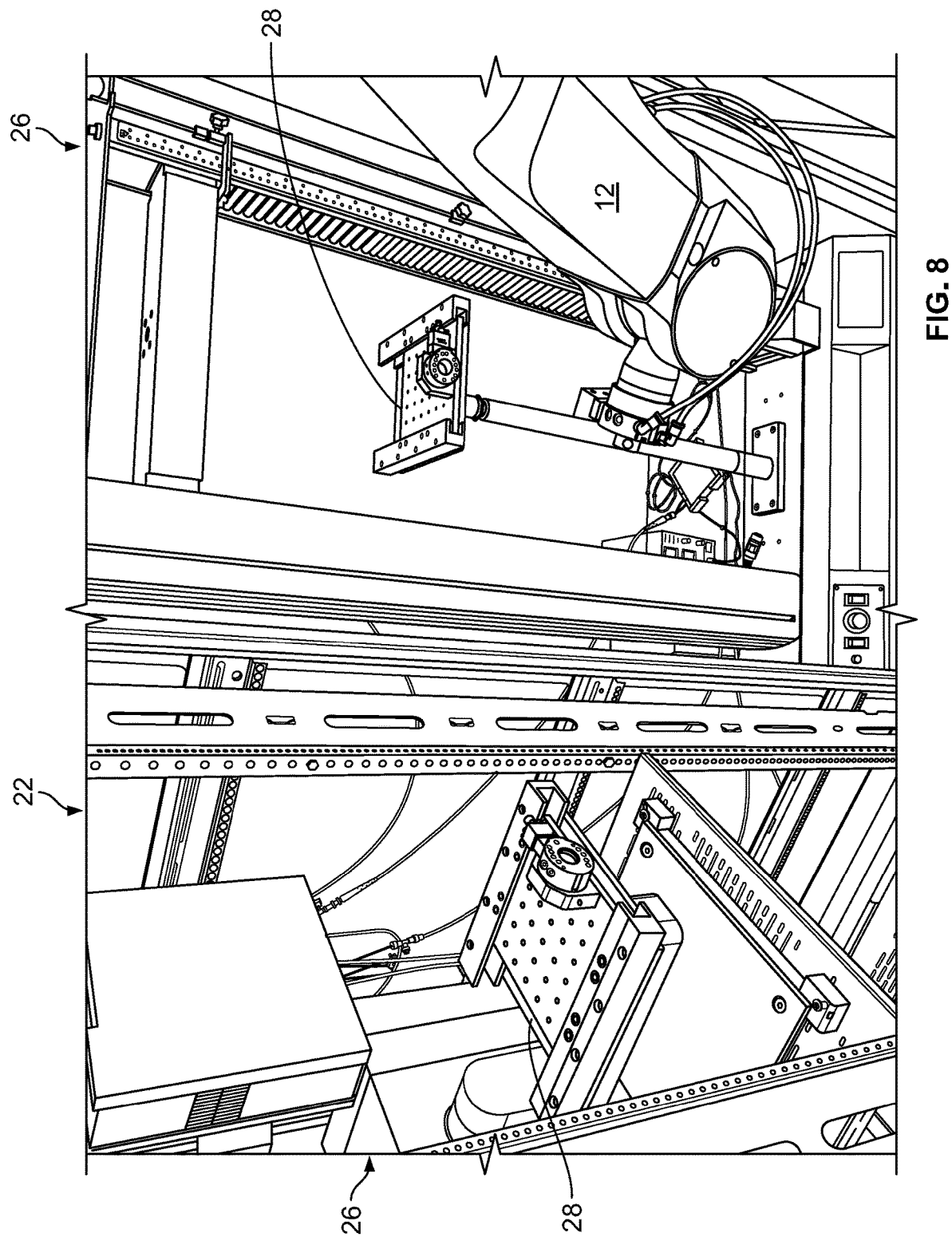
FIG. 8 is an upper perspective view of an exemplary arrangement of a part tray transported between inspection stations by a robot, according to the present invention.

The exemplary six-sided or honeycomb configuration of the inspection workcell 10 of the present invention provides a compact and centralized inspection workcell 10 where a single robot manipulator 12 extracts parts 14 from equipment rack 26 and presents them to five or more inspection stations 24, as partially shown in FIG. 8. This 'material scientist in a box' concept addresses a long-standing problem of gaining access to and scheduling inspection capabilities that may otherwise be remotely located. The workcell's compact, centralized co-location of multiple inspection stations 24, in combination with a robotic manipulator 12 and equipment rack 26 securing parts that are secured on part trays 28, permitting serially sequenced automatic inspections of parts 14 between the multiple inspection stations, provides the capability to reduce part inspection times from days to hours, or less, depending upon the total duration of inspection times.

Figure 9A:
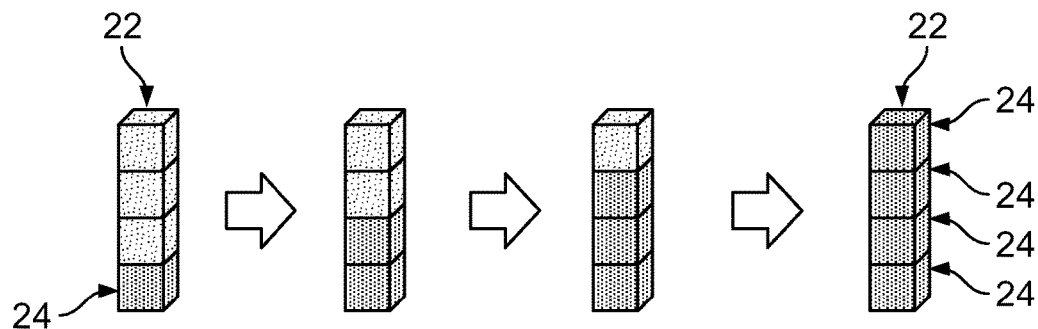
FIG. 9A is a schematic illustration showing modular inspection stations, according to the present invention.
Figure 9B:
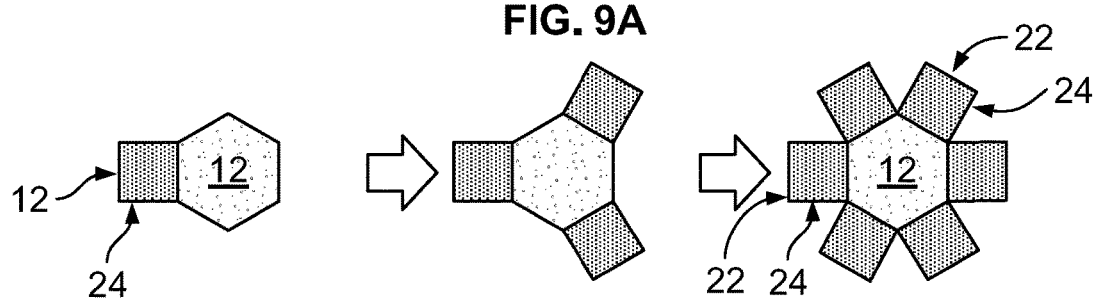
FIG. 9B is a schematic illustration showing expandability of the inspection workcell, according to the present invention.
Figure 9C:
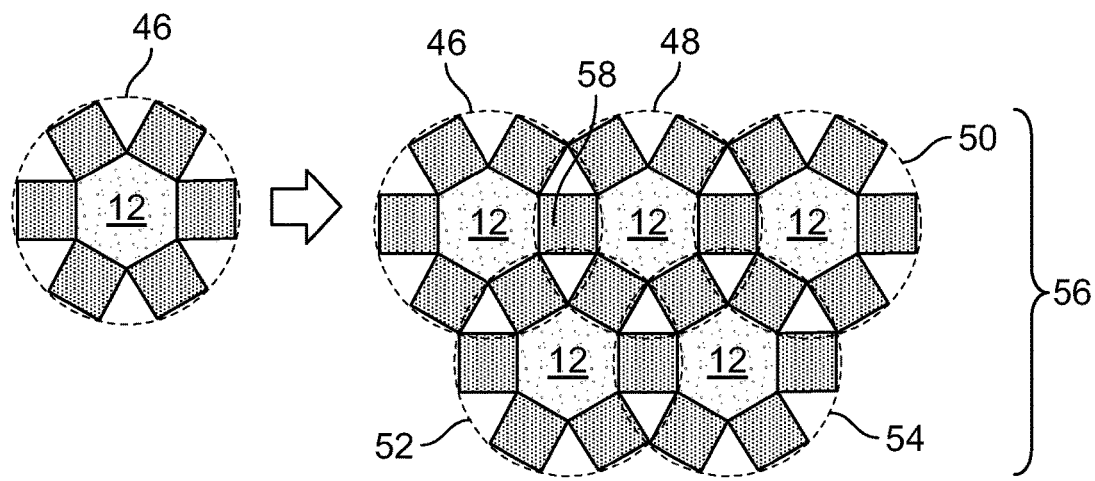
FIG. 9C is a schematic illustration showing scalability of the inspection workcell, according to the present invention.
Figure 9D:
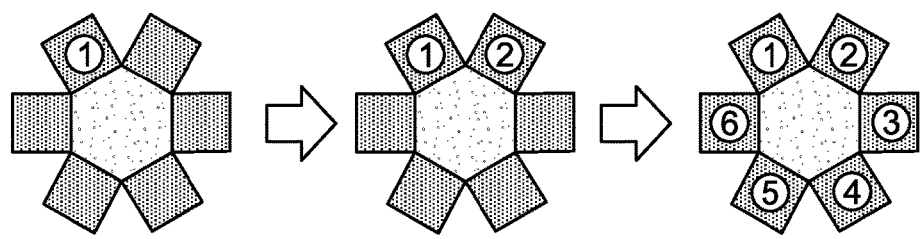
FIG. 9D is a schematic illustration showing parallelizability of the inspection workcell, according the present invention.

The workcell's hexagonal or honeycomb configuration, in addition to being modular, also provides system expandability and scalability to support increased inspection demands, as shown in FIGS. 9A-9D. For example, as shown in FIG. 9A, due to the inspection stations 24 secured in equipment rack 22 being modular, the equipment racks 22 can be mounted vertically in equipment rack 22, such as, for example, from one to four inspection stations 24. It is to be appreciated that more than four inspection stations 24 may be secured in a single equipment rack 22, depending upon the application. For example, as shown in FIG. 9B, as a result of the hexagonal or honeycomb configuration, one to six different inspection stations 24 secured in separate equipment racks 22 can surround the central robot manipulator 12, it being understood that part trays 28 (not shown in FIG. 9B) may also be secured in any/all of the equipment racks 22. As shown in FIG. 9C, the workcell is scalable, such that workcell 46 may be interconnected with adjacent workcells 48, 50, 52, 54 to form a larger workcell 56. Placing workcells side-by-side, such as workcell 46 and 48 with a shared equipment rack 58, increases inspection throughput by doubling the number of available robotic manipulators and inspection stations. As shown in FIG. 9C, there are five available robotic manipulators, although more could be added. As shown in FIG. 9D, the inspection stations 1 through 6 are parallelizable. That is, in one embodiment, each of the inspection stations may be the same, and can operate simultaneously.

For purposes herein, the term "workcell" refers not only to a robot manipulator surrounded by and operably connected to one or more equipment racks securing part trays and one or more inspection stations, but is also intended to include one or more interconnected workcells sharing or having a common equipment rack in which one or more part trays are accessible by one or more robotic manipulators, forming a larger, single integrated workcell.

The inspection workcell 10, such as shown in FIG. 1, also supports automated data collection and storage. Once an operator manually loads parts into a designated equipment rack and initiates the inspection process, automated inspection operations are started. Coupler 34 (FIG. 6) allows robotic manipulator 12 to extract selected parts 14 from equipment rack 26 and deliver them to individual inspection stations 24 in equipment rack 22. After each part 14 is inspected and returned to the equipment rack 26, the inspection data can be stored on a local PC. Inspection data can also be stored on individual part trays 28, permitting the collected data to be co-located with the inspection part 14 at all times. After the entire inspection process is completed, the collected data can be electronically sent to the customer's site for post-processing and further analysis.

While the exemplary configuration of inspection workcell primarily discussed is directed to a hexagonal or six-sided configuration, it is to be understood that other configurations may be used. For example, a three-sided configuration shown with FIG. 3 may be used, in which the configuration has less than six sides, as a result of the absence of three equipment racks 22, 26 from the hexagonal or six-sided configuration. In another embodiment, an inspection workcell may include a set of n equipment racks 22, 26 arranged in an n-sided configuration around robotic manipulator 12, where n is a positive integer. In another embodiment, a first set of n-sided equipment racks 22, 26 is arranged in an n-sided configuration around robotic manipulator 12, and a second set of n-sided equipment racks 22, 26 is arranged in an n-sided configuration around a second robotic manipulator 12, wherein at least one part tray 28 of at least one equipment rack 22, 26 of the set of n separate equipment racks 22, 26 and the second set of n separate equipment racks 22, 26 is accessible by the robotic manipulator 12 and the second robotic manipulator 12. In one embodiment, at least one equipment rack is common to each of the first set of n separate equipment racks and the second set of n separate equipment racks.

The present invention has been described as an inspection workcell. It will be understood that the above description is merely illustrative of the applications of the principles of the present invention, the scope of which is to be determined by the claims viewed in light of the specification. Other variants and modifications of the invention will be apparent to those of skill in the art.

What is claimed is:

1. An inspection workcell, comprising:
an equipment rack for securing one or more part trays comprising inspection parts;
one or more inspection stations for inspecting the inspection parts; and
a robotic manipulator for transporting the one or more part trays from the equipment rack to the one or more inspection stations;
wherein each of the one or more part trays include a high-precision registration surface for mounting the inspection parts; and
wherein the registration surface permits inspection of all surfaces of the inspection parts.

2. The inspection workcell of claim 1, wherein the one or more inspection stations is securable in the equipment rack or a second equipment rack.

3. The inspection workcell of claim 2, wherein six separate equipment racks are arranged in a hexagonal-shaped configuration around the robotic manipulator.

4. The inspection workcell of claim 2, wherein a set of n separate equipment racks are arranged in an n-shaped configuration around the robotic manipulator.

5. The inspection workcell of claim 4, wherein a second set of n separate equipment racks are arranged in a second n-shaped configuration around a second robotic manipulator, wherein at least one part tray of at least one equipment rack of the set of n separate equipment racks and the second set of n separate equipment racks is accessible by the robotic manipulator and the second robotic manipulator.

6. The inspection workcell of claim 5, wherein at least one equipment rack is common to each of the first set of n separate equipment racks and the second set of n separate equipment racks.

7. The inspection workcell of claim 1, wherein each of the part trays includes a coupler selectively receivable by the robotic manipulator.

8. The inspection workcell of claim 1, wherein each of the part trays is encoded with a unique identifier.

9. The inspection workcell of claim 1, wherein the registration surface includes uniformly spaced mounting holes.

10. The inspection workcell of claim 1, wherein the one or more inspection stations comprises two or more inspection stations and at least one of the two or more inspection stations are different from each other.

11. The inspection workcell of claim 1, wherein each of the one or more inspection stations are identical.

12. An inspection workcell, comprising:
a first equipment rack for securing one or more part trays comprising inspection parts;
one or more inspection stations for inspecting the inspection parts; and
a robotic manipulator for transporting the one or more part trays from the first equipment rack to the one or more inspection stations;
wherein the one or more inspection stations is securable in the first equipment rack or in a second equipment rack;
wherein each of the one or more part trays include a high-precision registration surface for mounting the inspection parts; and
wherein the registration surface permits inspection of all surfaces of the inspection parts.

13. A method of inspecting a part comprising:
securely mounting one or more inspection parts in a part tray;
securing the part tray in an equipment rack;
providing one or more inspection stations for inspecting the one or more inspection parts; and
transporting, via a robotic manipulator, the part tray from the equipment rack to the one or more inspection stations;
further comprising the step, after transporting, via a robotic manipulator, the part tray from the equipment rack to the one or more inspection stations, of arranging a set of n separate equipment racks in an n-shaped configuration around the robotic manipulator; and
further comprises the step, after arranging a set of n separate equipment racks in an n-shaped configuration around the robotic manipulator, of arranging a second n-shaped configuration around a second robotic manipulator, wherein at least one part tray of at least one equipment rack of the set of n separate equipment racks and the second set of n separate equipment racks is accessible by the robotic manipulator and the second robotic manipulator.

14. The method of claim 13, wherein the steps of securely mounting one or more inspection parts in a part tray and securing the part tray in an equipment rack are each performed manually.

15. The method of claim 13 further comprises the step, after transporting, via a robotic manipulator, the part tray from the equipment rack to the one or more inspection stations, of transporting, via a robotic manipulator, the part tray from the one or more inspection stations to the equipment rack.

16. The method of claim 13, wherein at least one equipment rack is common to each of the first set of n separate equipment racks and the second set of n separate equipment racks.

* * * * *